United States Patent Office 3,491,886
Patented Jan. 27, 1970

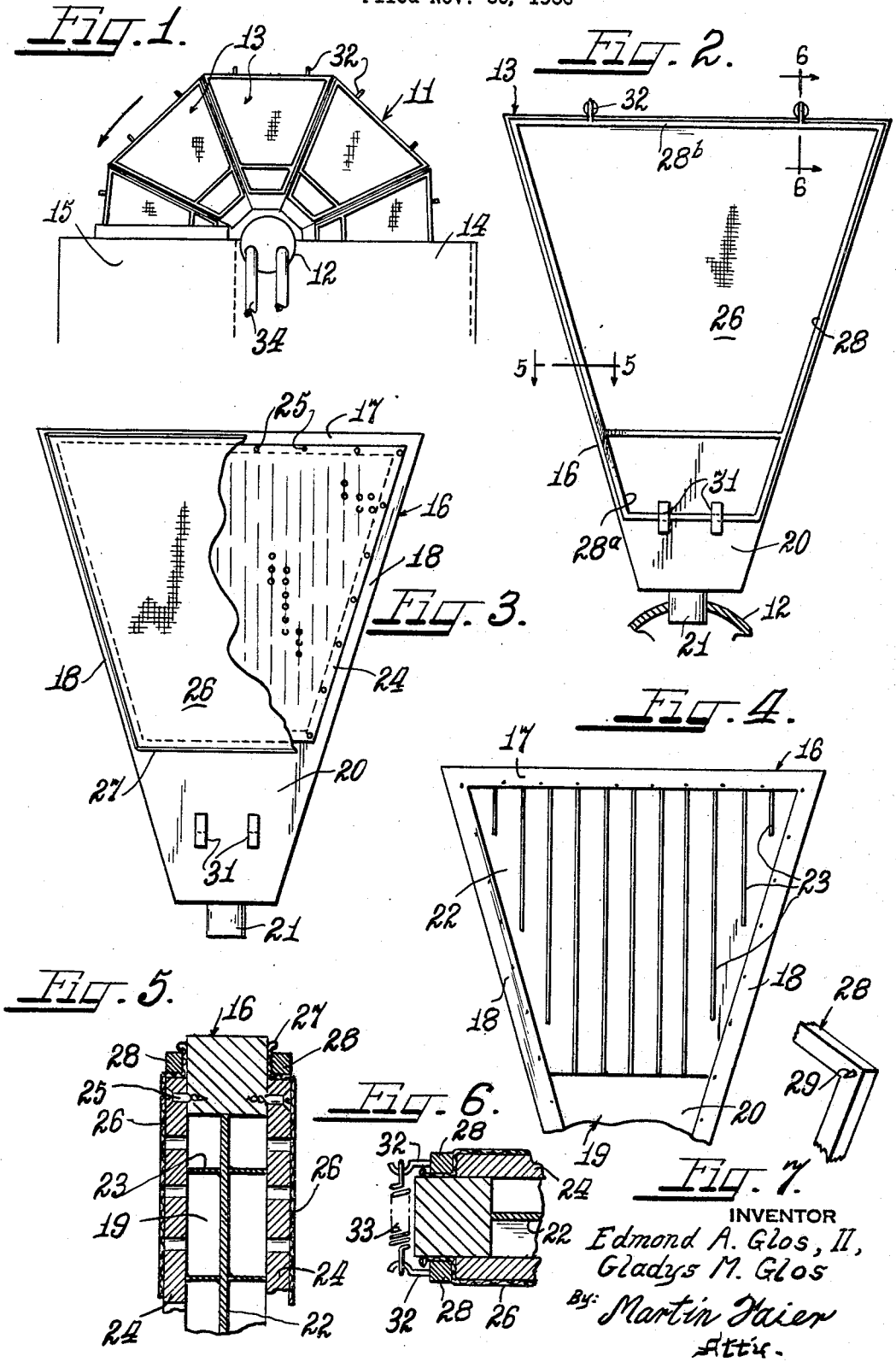

3,491,886
SECTOR FOR DISC FILTER APPARATUS
Edmond A. Glos II, and Gladys M. Glos, Riverwoods, Deerfield, Ill., assignors to John C. Settle Inc., a corporation of Illinois
Filed Nov. 30, 1966, Ser. No. 598,077
Int. Cl. B01d 25/04, 25/02
U.S. Cl. 210—232                    15 Claims

ABSTRACT OF THE DISCLOSURE

A polygonal filter sector having a hollow frame divided into like halves open at opposite faces, a perforated filter panel overlying each face, filter media overlying each panel, and a removably secured stretcher frame for holding the media taut over the panels.

---

This invention relates to improvements in filtering apparatus, and is more particularly related to novel means for the construction and assembly of a sector for a disc filter.

Industries requiring large filtering apparatus, particularly the mining industry, employ banks of filter discs, each comprised of a plurality of filter sectors having filter media thereon that is removable for replacement. These filter media are disposed over a sector frame, one on each face thereof, and in order to maintain maximum utility and wearability, they must be retained in taut condition. The sectors in a filter disc are in flow communication with a central hollow shaft, and the discs rotate slowly so that a portion thereof is at all times immersed in the slurry being filtered. In operation, negative pressure is maintained in the shaft so as to draw filtrate through the immersed filter sectors, which accumulate a filter cake on the filter media. At preselected intervals, usually in the region where the filter sectors re-enter the slurry, air pressure is applied on the interior of a sector so as to cause the filter cake to fall off the filter media and be discharged into a collector for conveyance away from the apparatus.

In the present invention, the replaceable filter media is drawn taut over a perforated back board or filter panel in a novel manner and by novel means, and the interior of the sector is provided with a central partition that serves to equalize pressures on both sides of the sector. This partition carries a plurality of spaced parallel ribs or flanges which function to control the flow of filtrate and reduce turbulence, and which also serve as reinforcement for the perforated panel arranged on each face of the sector.

It is therefore an object of the invention to provide a novel filtering apparatus.

Another object of the invention is to provide a novelly constructed filter unit for a filtering apparatus.

Further objects of the invention are to provide novel means to reduce turbulence of filtrate flowing through a filter unit, and to provide novel means for securing a soft filter media in taut condition.

Still another object of the invention is to provide a filter unit embodying novel features of construction, and one that is very efficient in use and not expensive to manufacture or maintain serviceable.

The structure by means of which the above noted and other advantages and objects of the invention are attained will be described in the following specification, taken in conjunction with the accompanying drawings, showing a preferred illustrative embodiment of the invention. In the drawings:

FIGURE 1 is an end view of a section of a rotary filter, showing a filter disc comprised of the improved filter sectors;

FIGURE 2 is a front elevational view of one of the filter sectors;

FIGURE 3 is a view similar to FIGURE 2, showing the stretcher frame removed and part of the filter media broken away;

FIGURE 4 is a fragmentary front elevational view of the filter sector, with the filter media and filter panel removed to show the interior construction thereof;

FIGURE 5 is an enlarged sectional detail of the filter sector, taken substantially on line 5—5 of FIGURE 2;

FIGURE 6 is an enlarged sectional detail view, taken substantially on line 6—6 of FIGURE 2, showing the stretcher frame lock means; and FIGURE 7 is a fragmentary detail view of one corner of the stretcher frame, showing the corner pin thereon.

Referring to the exemplary disclosure of the invention shown in the accompanying drawings, the representative filter apparatus shown in FIGURE 1 comprises a series of spaced apart filter discs 11 (one shown) mounted for rotation about or with a hollow shaft 12. The filter disc is made up of a plurality of like filter sectors or segments 13 embodying the features of the invention. In operation, the filter discs 11 are slowly rotated so as to continuously immerse their lower segments in a body of slurry contained in tank 14. During rotation of the filter discs 11, and just prior to segment re-entry into the slurry, air is admitted into the interior of such segment to blow filter cake off of the filter segment, and the cake falls into discharge areas 15 provided in the tank.

The filter segments 13 each comprise a substantially trapezoidal frame 16, including end walls 17 and inclined side walls 18. The frame defines an open faced chamber 19 having facing walls 20 adjacent the end of lesser width, and said end carries a duct or conduit 21 which is connected in flow communication with hollow shaft 12.

A central trapezoidal shaped partition wall 22, preferably of stainless steel or hardboard, is arranged in the frame to divide it into two like halves one opening onto each face of the chamber 19. Secured firmly on each face of said partition wall 22, as by welding, are a series of ribs or flanges 23. These flanges are parallel to one another and those in the medial area thereof extend from end to end, whereas those on the side areas thereof extend from the wide end to short of the related inclined edge, as shown. This partition and the flanges thereon reduce tubulance of air and filtrate entering the chamber 19, and, as will become apparent hereinafter, afford rigidity to the partition wall and support means for facing filter panels 24.

The facing filter panels 24 also are trapezoidal in shape, and one is laid over each face of the frame and secured thereto, as by screws 25. Each of these panels is perforated with the lines of perforations parallel to flanges 23. The perforations may be of any size required by the nature, viscosity and temperature of the slurry being filtered. The arrangement of the perforations is straight lined to reduce tubulance and prevent cavitation, i.e. filteration of air through the filter medium.

Laid over the outside face of each filter panel 24 is a filter media 26, which may consist of any suitable woven or intercised fabric, such as cotton, wool, nylon, Orlon, Dacron, polyethylene, polypropylene, or the like, even stainless steel fibers. The filter media is trapezoidal in shape and is of sufficient size to allow its edge margins to extend beyond the end edges of the underlying filter panel 24, and it is formed on its edges with a bead 27. When applied, the filter media is initially attached to the under side of a stretcher frame 28, to be described presently, corner pins 29 being provided for temporary retention of said filter media to said stretcher frame.

In order to be effective, the filter media 26 must be held taut over the face of the filter panel 24, and to this end the stretcher frame 28 is provided. The stretcher frame also functions to prevent leakage of filtrate into the perforations on the panel without first passing through the filter media. As best shown in FIGURES 2 and 7, the stretcher frame is of square rod stock formed to the shape of the filter panel and sized to be press fitted snugly down over the free margins of the filter media 26. Frame 28 also includes an end extension 28a that is initially engaged beneath a pair of rigid cleats 31 carried firmly on facing wall 20. The longer end bar 28b of the stretcher frame carries a pair of fastening devices, preferably in the form of hooks 32. The hooks on one stretcher frame align with the hooks on the other stretcher frame, and a tensioned spring 33, or like fastening device, is connected to opposed hooks for retaining the stretcher frames in place. The beads 27 prevent the filter media from pulling out from beneath the stretcher frame when the media is under pressure from within the unit and when the filter cake is blown off the media. It might be noted, upon reference to FIGURE 1, that the location of hooks 32 and fasteners 33 is such that they lie within the largest perimeter of the disc assembly, consequently affording no obstruction to disc rotation and at a point where wear thereon is minimized.

It should be evident that when a filter media, having a useful life averaging from 7 to 45 days, must be changed or replaced, the fastening means 33 is disengaged and the frames lifted off of the filter media, thus releasing the same, in an outwardly sliding movement as not to disturb adjacent discs in the bank, usually concentrically arranged about 14 to 18 inches from each disc to the next disc. When replacement of the filter panels 24 is required, each panel having a useful life of as much as 12 months, the panels may be removed and replaced by manipulation of the holding screws 25.

In operation, slurry is drawn onto and through the filter unit while it is immersed in the slurry. The filtrate passes through the filter media and filter panel and is discharged through hollow shaft 12; filter cake accumulating on the surface of the filter media is discharged into discharge area 15 and carried away from the apparatus by suitable conveyance means, when rotation of the disc carries a caked filter media into a predetermined position, at which point pressurized air is admitted into the unit, as through conduit 34 opening into the hollow shaft in communication with duct 21, in a manner well known in this art.

Although a preferred embodiment of this invention has been described in detail, it will be understood that the description thereof is intended to be illustrative only, rather than restrictive, as many details of the structure may be modified or changed without departing from the spirit or scope of the invention, and accordingly, it is not desired to be restricted to the exact construction described.

We claim:

1. A filter section adapted to form a filter cake on the outside of filter media secured thereto and to allow removal of the cake therefrom by pressure applied inside the section, said section comprising a hollow body open on at least one face, a filter panel overlying each open face, a frame having media retaining means and a margin accessible from one side of the body for withdrawal of the frame and filter media from the section independent of the body and panel, and tension means for removably securing said frame to the body and the media over the panel.

2. The filter section recited in claim 1 in which the hollow body has opposed open faces and a partition divides said body into two like parts.

3. The filter section recited in claim 2 in which the partition has parallel flanges underlying the filter panels.

4. The filter section recited in claim 1 in which the panel comprises a rigid sheet having apertures arranged in rows parallel to an axis of the body.

5. The filter section recited in claim 4 in which flanges arranged in rows parallel to an axis of said body underlie said panel apertures.

6. The filter section recited in claim 1 in which the body is substantially trapezoidal in shape.

7. The filter section recited in claim 1 in which the media retaining means comprises securing elements on the frame for holding media placed thereon independently of the body and panel.

8. The filter section recited in claim 1 in which the tension means includes complemental resilient elements on the body and said margin for removably fastening the frame to the body.

9. In a disc filter assembly having a series of spaced apart discs mounted for rotation about a shaft and in which each disc includes a plurality of filter sectors and has a peripheral portion accessible from an edge thereof, each said sector comprising a hollow body open on at least one face, an apertured filter panel overlying each open face, filter media overlying each filter panel, and filter securing means for holding the media taut over the panel and including a removable member having a margin accessible from the peripheral portion of the disc for withdrawal of said member and filter media from the assembly independently of the body and panel.

10. The filter sector recited in claim 9 in which the media securing means includes complemental resilient latch elements on the body and said removable member.

11. The filter sector recited in claim 9 in which the removable member includes means for detachably retaining the margins of the filter media to permit mounting of the media to said member independently of the body and panel.

12. The filter sector recited in claim 9 in which the margins of the media are thickened to resist pulling out of the media from the removable member.

13. The filter sector recited in claim 9 in which the apertured filter panel is removably secured to said body.

14. The filter sector recited in claim 9 in which the removable member and the margins of the media are removably nested over the peripheral edge of the panel under tension applied to said member by the securing means.

15. In filter media assembly for filter apparatus having a hollow body open on at least one face and a filter panel overlying said open face, said assembly comprising a stretcher frame for securing filter media over said panel and including media mounting means and a fastener for attaching said frame to the body, filter cloth adaptable to extend over said frame and cover said panel and having peripheral portions lying outside of said frame, and retaining means for said media to prevent unintended removal of the media from the frame when the frame is secured over said panel.

References Cited

UNITED STATES PATENTS

| | | | |
|---|---|---|---|
| 1,045,095 | 11/1912 | Neil | 210—486 |
| 1,685,085 | 9/1928 | Hoyt | 210—331 X |
| 1,746,409 | 2/1930 | Sweetland et al. | 210—331 |
| 1,757,355 | 5/1930 | Benjamin et al. | 210—331 |
| 2,565,388 | 8/1951 | McCaskell | 210—333 X |

FOREIGN PATENTS

| | | |
|---|---|---|
| 1,384,810 | 11/1964 | France. |
| 134,916 | 10/1902 | Germany. |

REUBEN FRIEDMAN, Primary Examiner

FRANK A. SPEAR, JR., Assistant Examiner

U.S. Cl. X.R.

210—331, 333, 347, 486